United States Patent
Shen et al.

(10) Patent No.: US 10,164,518 B2
(45) Date of Patent: Dec. 25, 2018

(54) POWER CONTROL DEVICE CAPABLE OF DETECTING THE CONDITION OF THE SENSING RESISTOR

(71) Applicant: WELTREND SEMICONDUCTOR INC., Hsinchu (TW)

(72) Inventors: Yi-Lun Shen, Hsinchu (TW); Ren-Yi Chen, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 0 days.

(21) Appl. No.: 15/974,678

(22) Filed: May 8, 2018

(65) Prior Publication Data

US 2018/0337591 A1    Nov. 22, 2018

(30) Foreign Application Priority Data

May 22, 2017   (TW) .............................. 106116825 A

(51) Int. Cl.
*H02M 1/32*    (2007.01)
*H02M 3/335*   (2006.01)
(Continued)

(52) U.S. Cl.
CPC .............. *H02M 1/32* (2013.01); *H02M 1/36* (2013.01); *H02M 3/06* (2013.01); *H02M 3/156* (2013.01);
(Continued)

(58) Field of Classification Search
CPC . H02M 2001/0003; H02M 2001/0009; H02M 2001/0025; H02M 1/32;
(Continued)

(56) References Cited

U.S. PATENT DOCUMENTS

| 7,760,478 B2 | 7/2010 | Yang |
| 8,203,811 B2 | 6/2012 | Lin |

(Continued)

FOREIGN PATENT DOCUMENTS

| CN | 101159416 A | 4/2008 |
| TW | I407657 B1 | 9/2011 |
| TW | 201308842 A1 | 2/2013 |
| TW | 201320567 A1 | 5/2013 |

*Primary Examiner* — Emily P Pham
*Assistant Examiner* — Shahzeb K Ahmad
(74) *Attorney, Agent, or Firm* — Winston Hsu

(57) ABSTRACT

A power control device includes a switch control circuit, a first resistor, a second resistor, a third resistor, a sense node, a first comparator, a second comparator, a transformation circuit, and a logic control circuit. The switch control circuit outputs a driving signal according to a set signal and a reset signal. The first resistor, the second resistor, and the third resistor generate a reference voltage according to a feedback current. The sense node receives a current sample voltage. The first comparator outputs a first control signal according to the current sample voltage and the reference voltage. The transformation circuit outputs a short detection voltage according to the current sample voltage. The second comparator outputs the second control signal according to the current sample voltage and the short detection voltage. The logic control circuit gate outputs the reset signal according to the first control signal and the second control signal.

10 Claims, 4 Drawing Sheets

(51) Int. Cl.
*H02M 1/36* (2007.01)
*H02M 3/06* (2006.01)
*H02M 3/156* (2006.01)
*H02M 1/00* (2006.01)

(52) U.S. Cl.
CPC ............. *H02M 3/33507* (2013.01); *H02M 2001/0009* (2013.01)

(58) Field of Classification Search
CPC ............ H02M 3/335; H02M 3/33507; H02M 3/33523; H02M 3/33538; H02M 3/337; H02M 7/04; H02M 7/12; H02M 7/125; H02M 7/155; H02M 7/1555
See application file for complete search history.

(56) References Cited

U.S. PATENT DOCUMENTS

| | | | |
|---|---|---|---|
| 8,390,964 B2 | 3/2013 | Chang | |
| 2008/0170420 A1* | 7/2008 | Yang | H02M 1/32 363/50 |
| 2013/0083562 A1* | 4/2013 | Wu | H02M 1/32 363/16 |
| 2014/0268920 A1* | 9/2014 | Fang | H02M 3/33523 363/21.15 |
| 2016/0172985 A1 | 6/2016 | Arima | |
| 2016/0359414 A1* | 12/2016 | Ozanoglu | H02M 3/1582 |
| 2017/0201179 A1* | 7/2017 | Yen | H02M 1/42 |
| 2017/0229969 A1* | 8/2017 | Chen | H02M 1/44 |
| 2017/0358990 A1* | 12/2017 | Papica | H02M 3/33523 |

* cited by examiner

POWER CONTROL DEVICE CAPABLE OF DETECTING THE CONDITION OF THE SENSING RESISTOR

BACKGROUND OF THE INVENTION

1. Field of the Invention

The present invention is related to a power control device, and more particularly to a power control device capable of detecting the condition of the sensing resistor.

2. Description of the Prior Art

As the functions of electronic products become more and more complicated, the electronic products adopt more and more electronic elements to meet the requirement. Since different electronic elements may have different power specification, such as different working voltages and different working currents, power systems are required to provide power supplies for different electronic elements after the electronic product receive the input power. For example, if the electronic elements require five different working voltages, such as 1.2 V, 3.3 V, 5 V, 7 V, and 12 V, then the power system may use five different power control devices to convert input power into appropriate working voltages for different electronic elements.

Generally, as long as the electronic product keeps operating, the power control device would have to output power to the electronic product consistently. Since the stability of the power supply is crucial in terms of performance of the electronic product, the reliability of the power control device has become one of the important quality factors. In addition, when the power control device operates for a long time with high currents, it would dissipate heat to damage electronic components. To prevent this, the prior art uses a sensing resistor to sense the current generated by the power control device, and turn off the output switch of the power control device when the current is overrated, preventing the electronic components from being damaged. That is, the overcurrent protection (OCP).

However, in prior art, if the sensing resistor is short-circuited, the power control device would not be able to detect the current, and fail to perform the OCP function. Therefore, the output switch will remain turned on, damaging to the electronic components.

SUMMARY OF THE INVENTION

One embodiment of the present invention discloses a power control device. The power control device includes a switch control circuit, a first resistor, a second resistor, a third resistor, a sense node, a first comparator, a transformation circuit, a second comparator, and a logic control circuit.

The switch control circuit receives a set signal and a reset signal, and outputs a driving signal according to the set signal and the reset signal. The first resistor has a first terminal configured to receive a first voltage, and a second terminal. The second resistor has a first terminal coupled to the second terminal of the first resistor for receiving a feedback current, and a second terminal. The third resistor has a first terminal coupled to the second terminal of the second resistor, and a second terminal for receiving a second voltage. The sense node receives a current sample voltage. The first comparator has a first input terminal coupled to the sense node, a second input terminal coupled to the second terminal of the second resistor, and an output terminal for outputting a first control signal. The transformation circuit is coupled to the sense node, and filters the current sample voltage to output a short detection voltage. The second comparator has a first input terminal coupled to the sense node, a second input terminal for receiving the short detection voltage, and an output terminal for outputting a second control signal. The logic control circuit has a first input terminal for receiving the first control signal, a second input terminal for receiving the second control signal, and an output terminal for outputting the reset signal.

Another embodiment of the present invention discloses a power control system. The power control system includes a power control device, a fourth resistor, a first capacitor, a first inductor, a primary switch, and a sensing resistor.

The power control device includes a switch control circuit, a first resistor, a second resistor, a third resistor, a sense node, a first comparator, a transformation circuit, a second comparator, and a logic control circuit.

The switch control circuit receives a set signal and a reset signal, and outputs a driving signal according to the set signal and the reset signal. The first resistor has a first terminal configured to receive a first voltage, and a second terminal. The second resistor has a first terminal coupled to the second terminal of the first resistor for receiving a feedback current, and a second terminal. The third resistor has a first terminal coupled to the second terminal of the second resistor, and a second terminal for receiving a second voltage. The sense node receives a current sample voltage. The first comparator has a first input terminal coupled to the sense node, a second input terminal coupled to the second terminal of the second resistor, and an output terminal for outputting a first control signal. The transformation circuit is coupled to the sense node, and filters the current sample voltage to output a short detection voltage. The second comparator has a first input terminal coupled to the sense node, a second input terminal for receiving the short detection voltage, and an output terminal for outputting a second control signal. The logic control circuit has a first input terminal for receiving the first control signal, a second input terminal for receiving the second control signal, and an output terminal for outputting the reset signal.

The fourth resistor has a first terminal for receiving a sensing voltage, and a second terminal coupled to the sense node. The first capacitor has a first terminal coupled to the sense node, and a second terminal for receiving the second voltage. The first inductor has a first terminal for receiving an input voltage, and a second terminal. The primary switch has a first terminal coupled to the second terminal of the first inductor, a second terminal, and a control terminal for receiving the driving signal. The sensing resistor has a first terminal coupled to the second terminal of the primary switch and the first terminal of the fourth resistor for generating the sensing voltage according to a current flowing through the primary switch, and a second terminal for receiving the second voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
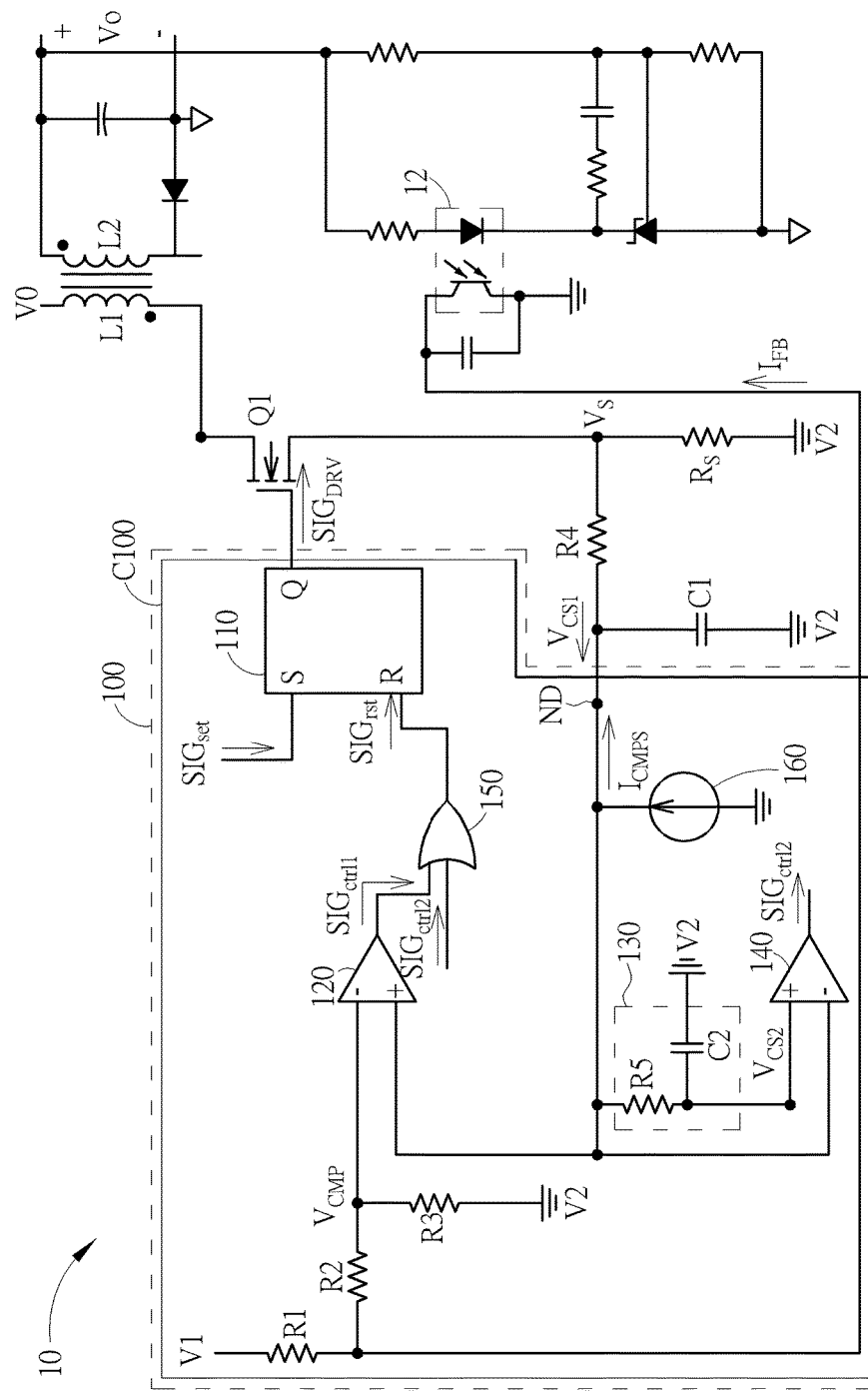
FIG. 1 shows a power control system according to one embodiment of the present invention.

FIG. 1 shows a power control system 10 according to one embodiment of the present invention. The power control system 10 includes a power control device 100, a first inductor L1, a primary switch Q1, a sensing resistor Rs, a second inductor L2, and an optical coupler 12.

The power control device 100 can output a driving signal $SIG_{DRV}$ with a high voltage level for turning on the primary switch Q1, and lower the voltage level of the driving signal $SIG_{DRV}$ to turn off the primary switch Q1 timely according to the feedback signal generated by the output voltage of the power control system 10, preventing the primary switch Q1 from generating overrated currents continuously to destabilize the system.

The primary switch Q1 has a first terminal, a second terminal, and a control terminal. The first terminal of the primary switch Q1 is coupled to the first inductor L1, and the control terminal of the primary switch Q1 can receive the driving signal $SIG_{DRV}$. The first inductor L1 has a first terminal and a second terminal. The first terminal of the first inductor L1 can receive the input voltage VO, and the second terminal of the first inductor L1 is coupled to the first terminal of the primary switch Q1. The sensing resistor Rs has a first terminal and a second terminal. The first terminal of the sensing resistor Rs is coupled to the second terminal of the primary switch Q1, and the second terminal of the sensing resistor Rs can receive a second voltage V2. In some embodiments, the input voltage VO can be the direct current (D.C.) voltage derived by regulating the external alternating current (A.C.) power, and the second voltage V2 can be, for example but not limited to, the ground voltage of the system.

Since the current generated by the primary switch Q1 will flow through the sensing resistor Rs, the voltage drop between the two terminals of the sensing resistor Rs will vary with the rating of the current flowing through the primary switch Q1. Therefore, the voltage at the first terminal of the sensing resistor Rs can be deemed as a sensing voltage Vs for determining the rating of the current generated by the primary switch Q1.

Since the second terminal of the first inductor L1 is coupled to the primary switch SW, the first inductor L1 is charged intermittently as the primary switch Q1 being turned on and turned off. The first inductor L1 can be, for example, a winding, and the external magnetic field will be changed during the charging and discharging processes, so the second inductor L2 can be induced to generate electricity. That is, the second inductor L2 can be coupled with the first inductor L1. By choosing the turns ratio of the first inductor L1 and the second inductor L2 properly, the induced voltage generated by the second inductor L2 can be adjusted to provide the power required by the external electronic elements.

The optical coupler 12 is coupled to the second inductor L2 and the first terminal of the second resistor R2, and can generate the feedback current $I_{FB}$ according to the output voltage $V_O$ of the second inductor L2.

In other words, the power control system 10 can be a flyback power control system, the first inductor L1 can be the primary circuit, the second inductor L2 can be the secondary circuit, and the optical coupler 12 can provide the feedback signal according to the output voltage $V_O$ of the second inductor L2 while preserving isolation of the power.

The power control device 100 includes a switch control circuit 110, a first resistor R1, a second resistor R2, a third resistor R3, a sense node ND, a first comparator 120, a transformation circuit 130, a second comparator 140, and a logic control circuit 150.

The switch control circuit 110 can receive the set signal $SIG_{set}$ and the reset signal $SIG_{rst}$, and can output the driving signal $SIG_{DRV}$ according to the set signal $SIG_{set}$ and the reset signal $SIG_{rst}$. In the embodiment of FIG. 1, the switch control circuit 110 can be a set-reset (SR) flip-flop. The set terminal S of the switch control circuit 110 can receive the set signal $SIG_{set}$, the reset terminal R of the switch control circuit 110 can receive the reset signal $SIG_{rst}$, and the output terminal Q of the switch control circuit 110 can output the driving signal $SIG_{DRV}$.

In some embodiments, the set signal $SIG_{set}$ can be a clock signal so the switch control circuit 110 can output the driving signal $SIG_{DRV}$ with a high voltage level periodically for turning on the primary switch Q1, and output the driving signal $SIG_{DRV}$ with a low voltage level for turning off the primary switch Q1 when the reset signal $SIG_{rst}$ is at a high voltage level, preventing the primary switch Q1 from generating overrated currents continuously to destabilize the system.

The first resistor R1 has a first terminal and a second terminal. The first terminal of the first resistor R1 can receive the first voltage V1. The second resistor R2 has a first terminal and a second terminal. The first terminal of the second resistor R2 is coupled to the second terminal of the first resistor R1 and can receive the feedback current $I_{FB}$. The third resistor R3 has a first terminal and a second terminal. The first terminal of the third resistor R3 is coupled to the second terminal of the second resistor R2, and the second terminal of the third resistor R3 can receive the second voltage V2.

In some embodiments, the feedback current $I_{FB}$ generated by the optical coupler 12 is related to the output voltage $V_O$ of the power control system 10. When the output voltage $V_O$ of the power control system 10 drops, the feedback current $I_{FB}$ will become smaller. In this case, the voltage at the second terminal of the second resistor R2, that is, the comparison reference voltage $V_{CMP}$, will be raised. On the contrary, when the output voltage $V_O$ of the power control system 10 is raised, the feedback current $I_{FB}$ will become larger. In this case, the comparison reference voltage $V_{CMP}$ will drop.

In other words, the first resistor R1, the second resistor R2, and the third resistor R3 can be used to convert the feedback current $I_{FB}$ into a proper divisional voltage, that is, the comparison reference voltage $V_{CMP}$, as a reference of the output voltage $V_O$ of the power control system 10.

In addition, the power control system 10 can further include a fourth resistor R4 and a first capacitor C1. The fourth resistor R4 and the first capacitor C1 can be disposed outside of the chip C100. The fourth resistor R4 has a first terminal and a second terminal. The first terminal of the fourth resistor R4 can be coupled to the first terminal of the sensing resistor Rs to receive the sensing voltage $V_s$, and the second terminal of the fourth resistor R4 can be coupled to the sense node ND. The first capacitor C1 has a first terminal and a second terminal. The first terminal of the first capacitor C1 is coupled to the second terminal of the fourth resistor R4, that is, the sense node ND, and the second terminal of the first capacitor C1 can receive the second voltage V2. In some embodiments, to filter the noise generated when the primary switch Q1 is switching, the fourth resistor R4 and the first capacitor C1 can low-pass filter the sensing voltage $V_S$. Therefore, the sense node ND can receive the current sample voltage $V_{CS1}$ with less noise.

The first comparator 120 has a first input terminal, a second input terminal, and an output terminal. The first input terminal (positive input terminal) of the first comparator 120 is coupled to the sense node ND, the second input terminal (negative input terminal) of the first comparator 120 is coupled to the second terminal of the second resistor R2, and the output terminal of the first comparator 120 can output the first control signal $SIG_{ctrl1}$. That is, the first comparator 120 can output the first control signal $SIG_{ctrl1}$ according to the comparison between the current sample voltage $V_{CS1}$ and the comparison reference voltage $V_{CMP}$.

For example, the first comparator 120 can output the first control signal $SIG_{ctrl1}$ with a high voltage level to have the switch control circuit 110 turn off the primary switch Q1 earlier when the current sample voltage $V_{CS1}$ is higher than the comparison reference voltage $V_{CMP}$. Consequently, when the output voltage $V_O$ of the power control system 10 is rather low, the comparison reference voltage $V_{CMP}$ would be raised, and, thus, the first comparator 120 will issue the first control signal $SIG_{ctrl1}$ with the high voltage level slower, comparing to the situation with the output voltage $V_O$ of the power control system 10 being normal. That is, in the case when the output voltage $V_O$ of the power control system 10 is rather low, the duty cycle of the primary switch Q1 will be extended. However, when the output voltage $V_O$ of the power control system 10 is rather high, the first comparator 120 will issue the first control signal $SIG_{ctrl1}$ with the high voltage level sooner, shortening the duty cycle of the primary switch Q1 and lowering the output voltage $V_O$ of the power control system 10.

Furthermore, in FIG. 1, to ensure that the over current protection works regularly no matter the input voltage of the power control device 100 is rather high or rather low, the power control device 100 can further include a current source 160. The current source 160 can be coupled to the second terminal of the fourth resistor R4, and can generate the compensation current $I_{CMPS}$ according to the input voltage of the power control device 100 to adjust the voltage drop between the first terminal and the second terminal of the fourth resistor R4, which can further adjust the current sample voltage $V_{CS1}$ used by the first comparator 120.

However, when the sensing resistor Rs used to detect the current generated by the primary switch Q1 is short-circuited, the sensing voltage $V_S$ received by the first terminal of the fourth resistor R4 will not vary with the current generated by the primary switch Q1. In this case, even if the current generated by the primary switch Q1 continues to increase or even becomes overrated, the first comparator 120 may not react and output the first control signal $SIG_{ctrl1}$ with the high voltage level. Therefore, the primary switch Q1 may remain turned on, overheating or damaging the electronic components.

To address this issue, the power control device 100 can use the transformation circuit 130 to filter the current sample voltage $V_{CS1}$ to output the short detection voltage $V_{CS2}$, and use the second comparator 140 to compare the short detection voltage $V_{CS2}$ and the current sample voltage $V_{CS1}$. The second control signal $SIG_{ctrl2}$ can be generated according to the comparison result, allowing the primary switch Q1 to be turned off in time even when the sensing resistor Rs is short-circuited.

In the embodiment of FIG. 1, the transformation circuit 130 includes a fifth resistor R5 and a second capacitor C2.

The fifth resistor R5 has a first terminal and a second terminal. The first terminal of the fifth resistor R5 is coupled to the sense node ND, and the second terminal of the fifth resistor R5 can output the short detection voltage $V_{CS2}$. The second capacitor C2 has a first terminal and a second terminal. The first terminal of the second capacitor C2 is coupled to the second terminal of the fifth resistor R5, and the second terminal of the second capacitor C2 can receive the second voltage V2. After being low-pass filtered by the transformation circuit 130, the current sample voltage $V_{CS1}$ and the short detection voltage $V_{CS2}$ will have a delay.

The second comparator 140 has a first input terminal, a second input terminal, and an output terminal. The first input terminal (negative input terminal) of the second comparator 140 is coupled to the sense node ND, the second terminal (positive input terminal) of the second comparator 140 can receive the short detection voltage $V_{CS2}$, and the output terminal of the second comparator 140 can output the second control signal $SIG_{ctrl2}$.

Figure 2:
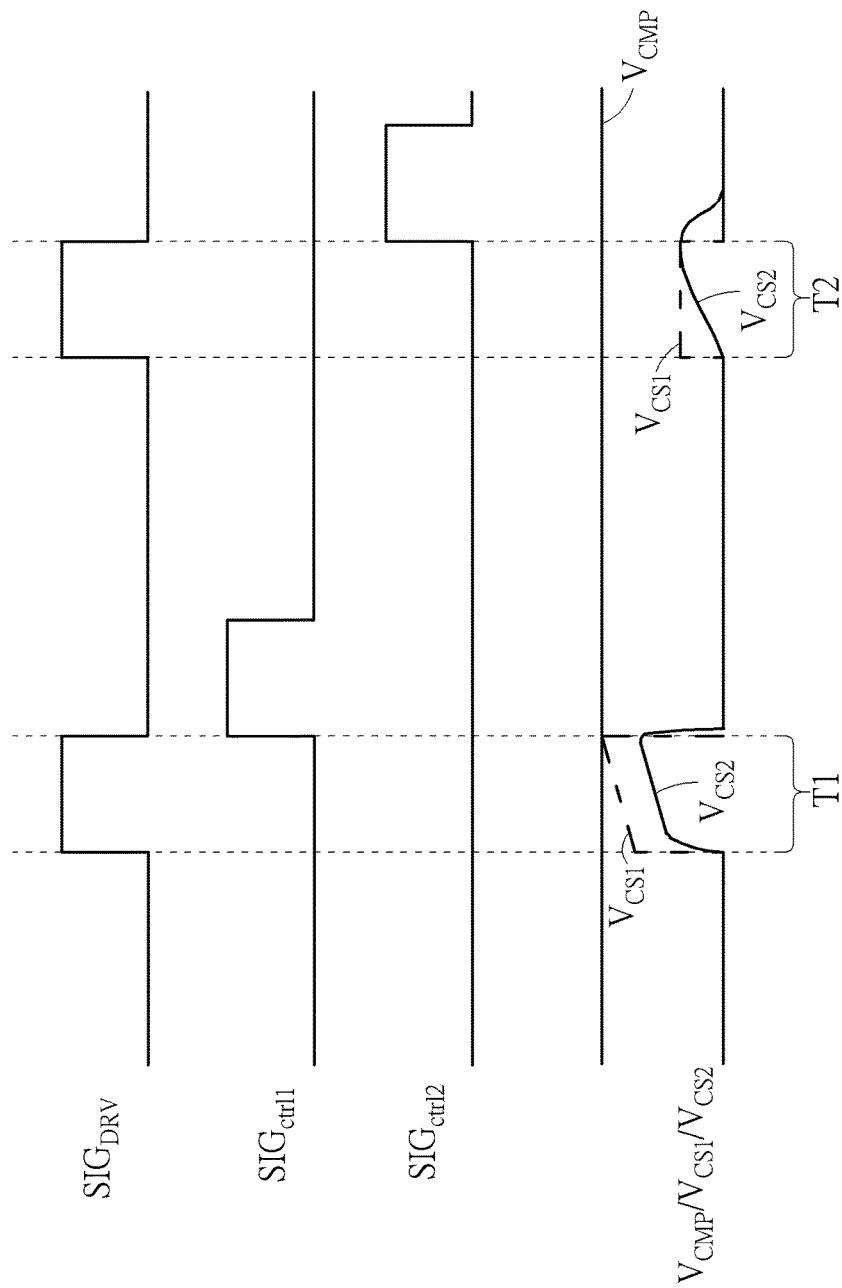
FIG. 2 shows a timing diagram of the voltages received by the power control device in FIG. 1.

FIG. 2 shows a timing diagram of the voltages received by the power control device 100 according to one embodiment of the present invention. In FIG. 2, during the first period T1, the sensing resistor Rs is not short-circuited, and the sensing voltage $V_S$ received by the first terminal of the fourth resistor R4 varies with the current generated by the primary switch Q1. During this period, as the current generated by the primary switch Q1 increases, the current sample voltage $V_{CS1}$ and the short detection voltage $V_{CS2}$ will increase. However, due to the delay caused by the transformation circuit 130, as the current sample voltage $V_{CS1}$ keeps changing, the short detection voltage $V_{CS2}$ will keep changing behind the current sample voltage $V_{CS1}$. In this case, the driving signal $SIG_{DRV}$ will remain at the high voltage level, and the first control signal $SIG_{ctrl1}$ will have the high voltage level when the first comparator 120 determines that the current sample voltage $V_{CS1}$ is higher than the comparison reference voltage $V_{CMP}$, pulling down the voltage of the driving signal $SIG_{DRV}$ and turning off the primary switch Q1.

During the second period T2, since the sensing resistor Rs is short-circuited, the sensing voltage $V_S$ received by the first terminal of the fourth resistor R4 will not be varied with the current generated by the primary switch Q1. During this period, although the current generated by the primary switch Q1 may increase, the current sample voltage $V_{CS1}$ will remain at the same value. Therefore, after a period of time, the short detection voltage $V_{CS2}$ will reach the same level as the current sample voltage $V_{CS1}$. In this case, although the first comparator 120 will not change the first control signal $SIG_{ctrl1}$ to have the high voltage level, the second comparator 140 can output the second control signal $SIG_{ctrl2}$ with the high voltage level when the short detection voltage $V_{CS2}$ gradually reaches the similar level as the current sample voltage $V_{CS1}$, pulling down the voltage of the driving signal $SIG_{DRV}$ and turning off the primary switch Q1. Consequently, even if the sensing resistor Rs is short-circuited, the primary switch Q1 can still be turned off in time, preventing the damages and overheat caused by continuously turning on.

In addition, to ensure that the second comparator 140 can sense the difference between the short detection voltage $V_{CS2}$ and the current sample voltage $V_{CS1}$ when the sensing resistor Rs is short-circuited, the transformation circuit 130 can further include a bias power source in some embodiments.

Figure 3:
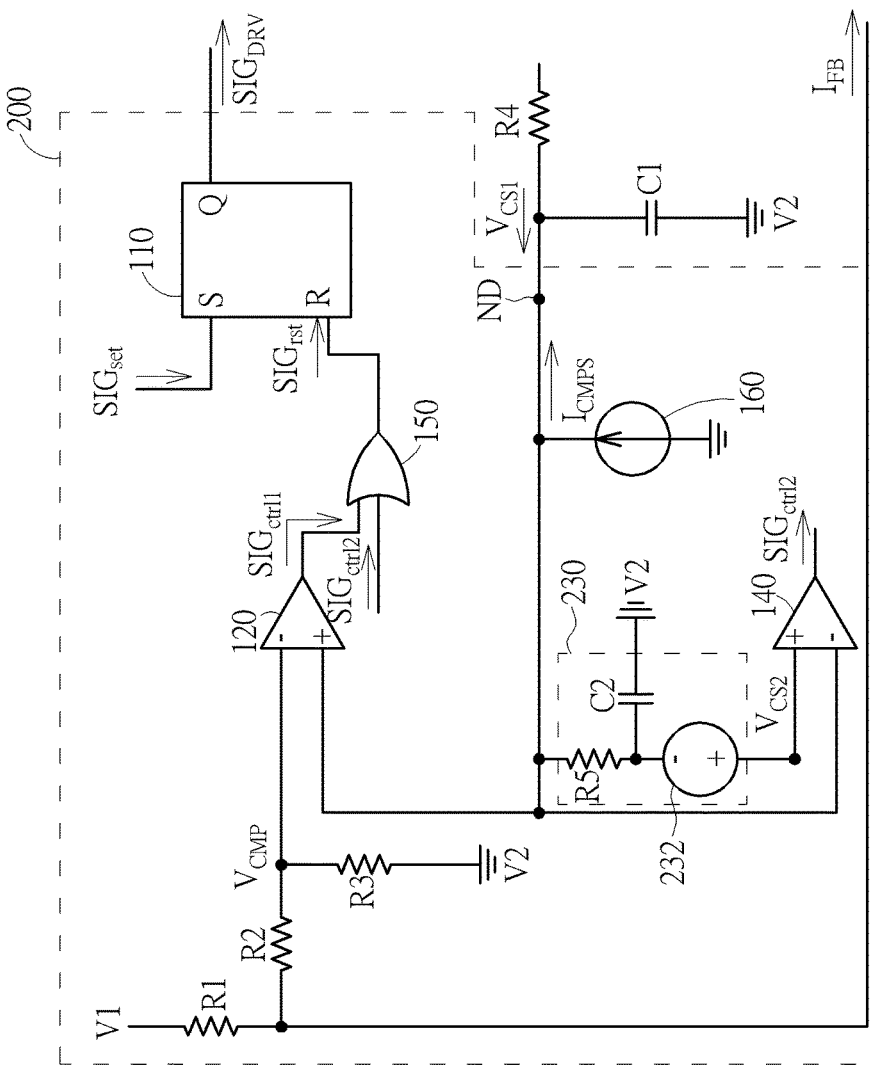
FIG. 3 shows a power control device according to another embodiment of the present invention.

FIG. 3 shows a power control device 200 according to another embodiment of the present invention. The power control devices 100 and 200 have similar structures, and a difference between these two is in that the transformation circuit 230 of the power control device 200 further includes a bias power source 232. The bias power source 232 can provide a fixed bias voltage, and can, for example, raise the short detection voltage $V_{CS2}$ by 5 mV. Consequently, when the sensing resistor Rs is short-circuited, the bias power source 232 can magnify the cross over between the short detection voltage $V_{CS2}$ and the current sample voltage $V_{CS1}$, assisting the second comparator 140 to detect the sensing resistor Rs being short-circuited more precisely to turn off the primary switch Q1 in time.

In FIG. 3, the first terminal of the fifth resistor R5 is coupled to the sense node ND. The bias power source 232 has a first terminal and a second terminal. The first terminal of the bias power 232 is coupled to the second terminal of the fifth resistor R5, and the second terminal of the bias power source 232 can output the short detection voltage $V_{CS2}$. The first terminal of the second capacitor C2 is coupled to the second terminal of the fifth resistor R5, and the second terminal of the second capacitor C2 can receive the second voltage V2.

The transformation circuit 130 in FIG. 1 and the transformation circuit 230 in FIG. 3 are two embodiments of the present invention, and in other embodiments, the designer may use other elements, such as amplifiers, to implement the transformation circuit to achieve the low-pass filtering function for delaying the current sample voltage $V_{CS1}$ In FIG. 1, the logic control circuit 150 has a first input terminal, a second input terminal, and an output terminal. The first input terminal of the logic control circuit 150 can receive the first control signal $SIG_{ctrl1}$, the second input terminal of the logic control circuit 150 can receive the second control signal $SIG_{ctrl2}$, and the output terminal of the logic control circuit 150 can output the reset signal $SIG_{rst}$. In some embodiments, the logic control circuit 150 can be, for example, an OR gate. Therefore, as long as at least one of the first control signal $SIG_{ctrl1}$ and the second control signal $SIG_{ctrl2}$ has a high voltage level, the logic control circuit 150 will output the reset signal $SIG_{rst}$ with a high voltage level, enabling the switch control circuit 110 to output the driving signal $SIG_{DRV}$ with a low voltage level to turn off the primary switch Q1.

Figure 4:
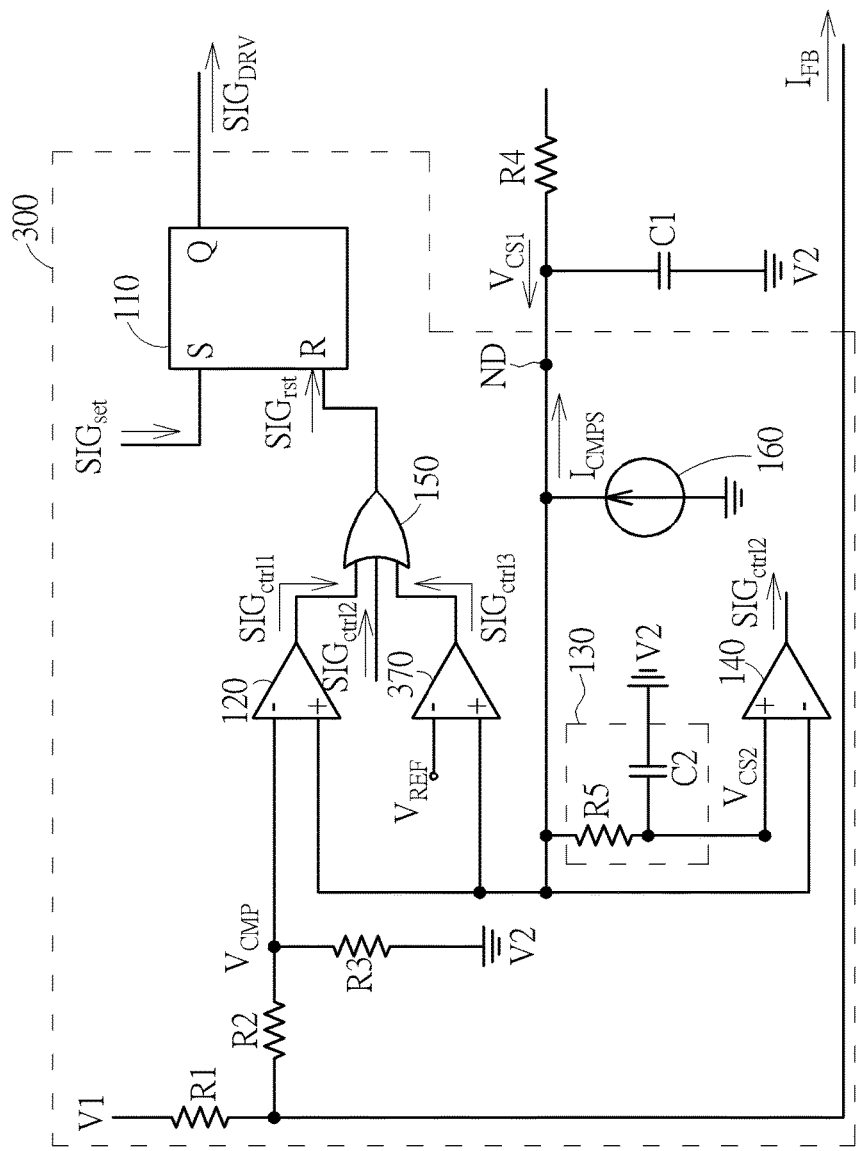
FIG. 4 shows a power control device according to another embodiment of the present invention.

FIG. 4 shows a power control device 300 according to another embodiment. The power control devices 200 and 300 have similar structures, and a difference between these two is in that the power control device 300 further includes a third comparator 370. The third comparator 370 has a first input terminal, a second input terminal, and an output terminal. The first input terminal (negative input terminal) of the third comparator 370 can receive the reference voltage $V_{REF}$, the second input terminal (positive input terminal) of the third comparator 370 can be coupled to the sense node ND, and the output terminal of the third comparator 370 can output the third control signal $SIG_{ctrl3}$.

In some embodiments, the reference voltage $V_{REF}$ can be a fixed voltage predetermined by the system. When the power control system 10 is initially activated, since the feedback signal is not stable yet, the comparison reference voltage $V_{CMP}$ may be higher, and the first comparator 120 may not be able to turn off the primary switch Q1 in time, damaging or overheating the electronic components due to huge currents. In this case, the third comparator 370 can compare the current sample voltage $V_{CS1}$ and the predetermined reference voltage $V_{REF}$, and output the third control signal $SIG_{ctrl3}$ with the high voltage level to turn off the primary switch Q1 when the system is not stable yet and the comparison reference voltage is rather high. Therefore, the over current protection can be achieved accordingly. In the power control device 300, the logic control circuit 350 can further include a third input terminal to receive the third control signal $SIG_{ctrl3}$.

In summary, the power control devices and the power control systems provided by the embodiments of the present invention can detect whether the sensing resistor is normal or becomes short-circuited, and turn off the primary switch when the sensing resistor is short-circuited, preventing the electronic device from being overheat or damaged due to the continuous high current.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power control device comprising:
   a switch control circuit configured to receive a set signal and a reset signal, and output a driving signal according to the set signal and the reset signal;
   a first resistor having a first terminal configured to receive a first voltage, and a second terminal;
   a second resistor having a first terminal coupled to the second terminal of the first resistor and configured to receive a feedback current, and a second terminal;
   a third resistor having a first terminal coupled to the second terminal of the second resistor, and a second terminal configured to receive a second voltage;
   a sense node configured to receive a current sample voltage;
   a first comparator having a first input terminal coupled to the sense node, a second input terminal coupled to the second terminal of the second resistor, and an output terminal configured to output a first control signal;
   a transformation circuit coupled to the sense node, and configured to filter the current sample voltage to output a short detection voltage;
   a second comparator having a first input terminal coupled to the sense node, a second input terminal configured to receive the short detection voltage, and an output terminal configured to output a second control signal; and
   a logic control circuit having a first input terminal configured to receive the first control signal, a second input terminal configured to receive the second control signal, and an output terminal configured to output the reset signal.

2. The power control device of claim 1, wherein the transformation circuit comprises:
   a fifth resistor having a first terminal coupled to the sense node, and a second terminal configured to output the short detection voltage; and
   a second capacitor having a first terminal coupled to the second terminal of the fifth resistor, and a second terminal configured to receive the second voltage.

3. The power control device of claim 1, wherein the transformation circuit comprises:
   a fifth resistor having a first terminal coupled to the sense node, and a second terminal;
   a bias power source having a first terminal coupled to the second terminal of the fifth resistor, and a second terminal configured to output the short detection voltage; and a second capacitor having a first terminal coupled to the second terminal of the fifth resistor, and a second terminal configured to receive the second voltage.

4. The power control device of claim 1, further comprising:
a third comparator having a first input terminal configured to receive a reference voltage, a second input terminal coupled to the sense node, and an output terminal configured to output a third control signal.

5. The power control device of claim 4, wherein:
the logic control circuit is an OR gate; and
the logic control circuit further has a third input terminal configured to receive the third control signal.

6. The power control device of claim 1, wherein:
the switch control circuit is a set-reset (SR) flip-flop having a set terminal configured to receive the set signal, a reset terminal configured to receive the reset signal, and an output terminal configured to output the driving signal; and
the set signal is a clock signal.

7. The power control device of claim 1, further comprising a current source coupled to the sense node, and configured to generate a compensation current according to an input voltage of the power control device to adjust the current sample voltage.

8. A power control system comprising:
a power control device comprises:
a switch control circuit configured to receive a set signal and a reset signal, and output a driving signal according to the set signal and the reset signal;
a first resistor having a first terminal configured to receive a first voltage, and a second terminal;
a second resistor having a first terminal coupled to the second terminal of the first resistor and configured to receive a feedback current, and a second terminal;
a third resistor having a first terminal coupled to the second terminal of the second resistor, and a second terminal configured to receive a second voltage;
a sense node configured to receive a current sample voltage;
a first comparator having a first input terminal coupled to the sense node, a second input terminal coupled to the second terminal of the second resistor, and an output terminal configured to output a first control signal;
a transformation circuit coupled to the sense node, and configured to filter the current sample voltage to output a short detection voltage;
a second comparator having a first input terminal coupled to the sense node, a second input terminal configured to receive the short detection voltage, and an output terminal configured to output a second control signal; and
a logic control circuit having a first input terminal configured to receive the first control signal, a second input terminal configured to receive the second control signal, and an output terminal configured to output the reset signal;
a fourth resistor having a first terminal configured to receive a sensing voltage, and a second terminal coupled to the sense node;
a first capacitor having a first terminal coupled to the sense node, and a second terminal configured to receive the second voltage;
a first inductor having a first terminal configured to receive an input voltage, and a second terminal;
a primary switch having a first terminal coupled to the second terminal of the first inductor, a second terminal, and a control terminal configured to receive the driving signal; and
a sensing resistor having a first terminal coupled to the second terminal of the primary switch and the first terminal of the fourth resistor for generating the sensing voltage according to a current flowing through the primary switch, and a second terminal configured to receive the second voltage.

9. The power control device of claim 8, further comprising:
a second inductor coupled with the first inductor; and
an optical coupler coupled to the second inductor and the first terminal of the second resistor, and configured to generate the feedback current according to an output voltage of the second inductor.

10. The power control device of claim 8, wherein the transformation circuit comprises:
a fifth resistor having a first terminal coupled to the sense node, and a second terminal;
a bias power source having a first terminal coupled to the second terminal of the fifth resistor, and a second terminal configured to output the short detection voltage; and
a second capacitor having a first terminal coupled to the second terminal of the fifth resistor, and a second terminal configured to receive the second voltage.

* * * * *